United States Patent
Cao et al.

(10) Patent No.: US 10,030,146 B2
(45) Date of Patent: Jul. 24, 2018

(54) THERMOSET MODIFIED ADDITIVE FOR ASPHALT MIXTURE, PREPARATION METHOD THEREOF AND ASPHALT MIXTURE

(71) Applicant: RESEARCH INSTITUTE OF HIGHWAY MINISTRY OF TRANSPORT, Beijing (CN)

(72) Inventors: Dongwei Cao, Beijing (CN); Yanjun Zhang, Beijing (CN); Shifeng Wang, Shanghai (CN)

(73) Assignee: RESEARCH INSTITUTE OF HIGHWAY MINISTRY OF TRANSPORT, Beijing (CN)

( * ) Notice: Subject to any disclaimer, the term of this patent is extended or adjusted under 35 U.S.C. 154(b) by 0 days.

(21) Appl. No.: 14/780,340

(22) PCT Filed: May 23, 2014

(86) PCT No.: PCT/CN2014/078228
§ 371 (c)(1),
(2) Date: Sep. 25, 2015

(87) PCT Pub. No.: WO2015/100926
PCT Pub. Date: Jul. 9, 2015

(65) Prior Publication Data
US 2016/0297968 A1    Oct. 13, 2016

(30) Foreign Application Priority Data
Jan. 3, 2014    (CN) .......................... 2014 1 0003536

(51) Int. Cl.
| | |
|---|---|
| *C08L 95/00* | (2006.01) |
| *C08L 63/00* | (2006.01) |
| *C08L 75/00* | (2006.01) |
| *C08L 75/04* | (2006.01) |
| *C08K 3/26* | (2006.01) |
| *C08K 3/34* | (2006.01) |
| *C08K 5/101* | (2006.01) |
| *C08K 5/20* | (2006.01) |
| *C08K 5/315* | (2006.01) |
| *C08K 5/3445* | (2006.01) |
| *C08K 5/3492* | (2006.01) |
| *C08L 67/00* | (2006.01) |
| *E01C 7/30* | (2006.01) |
| *E01C 23/00* | (2006.01) |
| *E01D 22/00* | (2006.01) |
| *C08G 59/50* | (2006.01) |

(52) U.S. Cl.
CPC .............. *C08L 95/00* (2013.01); *C08G 59/50* (2013.01); *C08K 3/26* (2013.01); *C08K 3/34* (2013.01); *C08K 3/346* (2013.01); *C08K 5/101* (2013.01); *C08K 5/20* (2013.01); *C08K 5/3155* (2013.01); *C08K 5/3445* (2013.01); *C08K 5/34924* (2013.01); *C08L 63/00* (2013.01); *C08L 67/00* (2013.01); *C08L 75/00* (2013.01); *C08L 75/04* (2013.01); *E01C 7/30* (2013.01); *E01C 23/00* (2013.01); *E01D 22/00* (2013.01); *C08K 2003/265* (2013.01); *C08L 2555/22* (2013.01); *C08L 2555/52* (2013.01); *C08L 2555/80* (2013.01)

(58) Field of Classification Search
CPC ....................................................... C08L 95/00
See application file for complete search history.

(56) References Cited

U.S. PATENT DOCUMENTS

| | | | | |
|---|---|---|---|---|
| 3,193,519 | A * | 7/1965 | Gessler ................... | C04B 26/02 260/998.19 |
| 3,915,730 | A | 10/1975 | Lehureau et al. | |
| 4,966,927 | A | 10/1990 | Hodson | |
| 5,925,695 | A * | 7/1999 | Ohtsuka .................. | C08L 63/08 264/331.13 |
| 6,150,439 | A * | 11/2000 | Keiichi ................... | C08L 53/02 524/59 |
| 6,316,529 | B1 | 11/2001 | Temme et al. | |
| 9,815,983 | B2 * | 11/2017 | Krafft ..................... | C08L 95/00 |
| 2003/0100621 | A1 * | 5/2003 | Loh ........................ | C08J 9/0061 521/82 |
| 2004/0127614 | A1 * | 7/2004 | Jiang ..................... | C08F 10/00 524/270 |
| 2007/0213418 | A1 * | 9/2007 | Vermilion .............. | C08J 9/0061 521/83 |
| 2007/0282039 | A1 * | 12/2007 | Smith ..................... | C08L 95/00 524/59 |
| 2009/0092847 | A1 * | 4/2009 | Onoe ...................... | B32B 27/08 428/500 |

(Continued)

FOREIGN PATENT DOCUMENTS

| | | |
|---|---|---|
| CN | 1952012 | 4/2007 |
| CN | 101255276 | 9/2008 |

(Continued)

*Primary Examiner* — Megan McCulley
(74) *Attorney, Agent, or Firm* — IP & T Group LLP

(57) ABSTRACT

A thermoset modified additive for asphalt mixture includes the following raw materials: resin, curing agent, promoter, flow agent, filler and additive, wherein the weight part proportions of the raw materials are: resin 35-70, curing agent 1-35, promoter 0-2.5, flow agent 0-6, filler 20-40 and additive 0-2. The asphalt mixture includes thermoset modified additive for asphalt mixture, matrix asphalt or modified asphalt and mineral aggregate, wherein the weight part proportions of the raw materials are: thermoset modified additive for asphalt mixture 1-5, matrix asphalt 2-8 and mineral aggregate 87-97. The thermoset modified additive for asphalt mixture is prepared by dry process modification technology; the prepared modified additive is powdery, has small particle size, and is easy to disperse in asphalt mixture; and the asphalt mixture prepared from the modified additive has simple operation process and low cost, and can be subjected to continuous production.

15 Claims, No Drawings

(56) References Cited

U.S. PATENT DOCUMENTS

| | | | | |
|---|---|---|---|---|
| 2010/0272908 A1* | 10/2010 | Sturgill | ............... | C09J 163/00 |
| | | | | 427/386 |
| 2011/0224378 A1* | 9/2011 | Grenda | ............. | C08G 59/4246 |
| | | | | 525/286 |
| 2011/0233105 A1* | 9/2011 | Bailey | ............... | C09D 195/00 |
| | | | | 206/525 |
| 2013/0116364 A1* | 5/2013 | Butz | ............... | C08J 3/128 |
| | | | | 524/71 |
| 2013/0162063 A1* | 6/2013 | Sasajima | ............ | H02K 1/2766 |
| | | | | 310/43 |
| 2013/0206756 A1* | 8/2013 | Niederst | ............... | B05D 7/227 |
| | | | | 220/62.12 |

FOREIGN PATENT DOCUMENTS

| CN | 101696097 | 4/2010 |
|---|---|---|
| CN | 102585528 | 7/2012 |
| CN | 103756259 | 4/2014 |

* cited by examiner

THERMOSET MODIFIED ADDITIVE FOR ASPHALT MIXTURE, PREPARATION METHOD THEREOF AND ASPHALT MIXTURE

This application is a national stage application of PCT/CN2014/078228 filed on May 23, 2014, which claims priority of Chinese patent application number 201410003536.9 filed on Jan. 3, 2014. The disclosure of each of the foregoing applications is incorporated herein by reference in its entirety.

TECHNICAL FIELD

The present invention relates to the road engineering field, in particular; relates to a thermoset modified additive for asphalt mixture, a preparation method thereof and an asphalt mixture prepared using the modified additive.

BACKGROUND

In recent years, due to the rapid development of traffic and transportation, the traffic volume and vehicle axle load rapidly increase and the travelling, is channelized, which raises higher requirements for the performance of asphalt and asphalt mixture. On the one hand, the asphalt mixture is required to have high-temperature stability, thus not causing rutting; on the other hand, the asphalt is required to have low-temperature crack resistance and fatigue resistance, and prolong the service life of road surface. Especially, the requirement for asphalt binder is increasing due to the development of asphalt pavement technology.

In order to improve usability of asphalt and achieve quality level of engineering requirements, various modified asphalts prepared by methods such as blending and adding admixture, etc, are employed to meet engineering requirements. Although the generalization of modified asphalts improves pavement performance, the thermoplasticity of the asphalt is not changed, therefore, it is difficult to overcome common defects of asphalt pavement.

Thermoset-modified asphalt mixture is prepared from thermosetting resin and graded aggregates. The thermosetting resin includes epoxy resin, polyurethane, phenolic resin, polyester and the like. During modification process, the thermosetting resin is reacted with curing agent in a curing reaction to form an irreversible cured substance which is crosslinked in is network structure. The curing reaction converts thermoplastic asphalt into thermoset asphalt; therefore, the thermoset-modified asphalt has excellent physical and mechanical performances. Generally, the thermoset-modified asphalt mixture is constituted by adding certain stone materials. Due to the fact that the thermosetting resin possesses high strength after curing, it is also called high-strength asphaltic concrete material. The thermosetting resin, which has large rigidity, good flexibility, excellent fatigue resistance and durability, is an ideal material for pavement layer of steel bridge deck, pavement wearing layer and overload traffic road, and has wide application prospect.

At present, the most widely-used material in thermoset modification technology is epoxy asphalt mixture. A conventional modification technology for epoxy asphalt mixture is wet modification technology, comprising firstly preparing epoxy-modified asphalt which generally comprises two components, wherein the first component is epoxy resin and the second component comprises asphalt and other components such as curing agent, etc., the two components are mixed at a certain ratio to form epoxy resin-modified asphalt; and then adding some stone materials into the epoxy-modified asphalt to produce the epoxy asphalt mixture. Such method not only requires complex process, but also generally has difficulty in forming stable modified asphalt when epoxy resin and curing agent are directly added into the asphalt, due to the incompatibility of asphalt and epoxy resin with each other.

Chinese Patent CN101255276A discloses an epoxy asphalt material for road-bridge and the environment-friendly preparation method thereof. Asphalt is modified in the method by grafting reactive functional groups onto the asphalt to improve the compatibility between epoxy resin and asphalt and make asphalt itself become a curing agent for epoxy resin, forming a composite curing agent by combing asphalt with a curing agent and a promoter, and mixing the composite curing agent with epoxy resin to prepare the modified asphalt. Chinese Patent CN1952012A discloses a thermosetting epoxy asphalt material prepared by utilizing a special compatibilizer to improve the compatibility between epoxy resin and asphalt. The method for preparation of the compatibilizer is complex method with a high cost, and is not suitable for use in industry. Furthermore, it is difficult to control the stability of modified asphalt in practical application, thereby making the application complex.

DESCRIPTION OF THE INVENTION

One purpose of the present invention is to provide a thermoset modified additive for asphalt mixture, with a view to the technical problems present in current thermoset-modified asphalt. The thermoset modified additive for asphalt mixture according to the present invention is prepared by a simple method, i.e. thermoset dry process modification technology, and can be produced continuously; the prepared asphalt mixture has good stability and is suitable for paving and repairing of steel bridge decks, tunnels, airports, highways and arterial streets.

Another purpose of the present invention is to provide a method for preparation of the thermoset modified additive for asphalt mixture.

The third purpose of the present invention is to provide an asphalt mixture prepared using the modified additive.

For achieving the above-mentioned purposes, the technical solutions of the present invention are:

a thermoset modified additive for asphalt mixture, comprising raw materials: resin, curing agent, promoter, flow agent, filler and additive, wherein the weight part proportions of the raw materials are: resin 35-70, curing agent 1-35, promoter 0-2.5, flow agent 0-6, filler 20-40 and additive 0-2;

Wherein in the weight part proportions of the raw materials, promoter 0-2.5, flow agent 0-6 and additive 0-2 mean that the promoter, flow agent and additive in the raw materials can be optionally added or not.

Wherein the additive is coupling agent or plasticizer, preferably coupling agent.

Especially, the coupling agent is silane coupling agent or titanate coupling agent, preferably silane coupling agent.

Wherein the resin is one or more of epoxy resin, polyester resin, phenolic resin and polyurethane, preferably epoxy resin.

Wherein the curing agent is one or more of amine curing agent, anhydride curing agent, hydrazide curing agent, imidazole curing agent, hydroxyl-terminated phenolic resin, polyester resin: acrylic resin, polyglycidyl ester, hydroxyalkylamide and oxazoline.

Especially, the amine curing, agent is one or more of dicyandiamide, triethylenetetramine and m-phenylenediamine, preferably dicyandiamide Especially, the anhydride curing agent is one or more of methyl tetrahydrophthalic anhydride, pyromellitic dianhydride, phthalic anhydride, polyazelaic polyanhydride and mug oil anhydride.

Especially, the hydrazide curing agent is one or more of sebacic dihydrazide, adipic dihydrazide and isophthalic dihydrazide, preferably sebacic dihydrazide.

Especially, the imidazole curing agent is one or more of imidazole, 2-methylimidazole and 2-ethyl-4-methylimidazole, preferably 2-methylimidazole.

Especially, the polyglycidyl ester is one or more of triglycidyl isocyanurate, glycidyl methacrylate and diglycidyl ester, preferably triglycidyl isocyanurate.

Especially, the hydrox-yalkylamide is N,N,N',N'-tetra[β-hydroxyethyl]adipamide or N,N,N',N'-tetra[β-hydroxypropyl]adipamide, preferably N,N,N',N'-tetra[β-hydroxyethyl] adipamide.

Especially, the oxazoline is one or more of phenylene dioxazoline, 2-ethyl-2-oxazoline and 2,2-bis(2-oxazoline), preferably phenylene dioxazoline.

Wherein the promoter is one or more of imidazole promoter, tertiary amine promoter or metal oxide, preferably imidazole promoter or tertiary amine promoter, and further preferably tertiary amine promoter.

Especially, the imidazole promoter is one or more of imidazole, 2-methylimidazole and 2-ethyl-4-methylimidazole preferably 2-methylimidazole.

Especially, the tertiary amine promoter is one or more of benzyl dimethylamine, 2,4,6-tri(dimethylaminomethyl)phenol (DMP-30) and N—N-dimethylaniline, preferably DMP-30.

Wherein the flow agent is one or more of acrylate, silicone resin, phenolic resin, amino resin and cellulose acetate butyrate, preferably acrylate.

Wherein the filler is one or more of clay, talc powder, calcium carbonate, barium sulfate and silica.

Another aspect of the present invention is to provide a method for preparation of the thermoset modified additive for asphalt mixture, comprising the following steps:

1) mixing resin, curing agent, promoter, flow agent, filler and additive well, adding the mixture into an extruder for extrusion treatment, so as to obtain an extruded material;

2) subjecting the extruded material to grinding treatment or granulation treatment after it is cooled, so as to obtain a material with particle size of less than 1 mm, i.e. the thermoset modified additive for asphalt mixture;

wherein the temperature for the extrusion treatment is 90-120° C.

Still another aspect of the present invention is to provide an asphalt mixture, comprising the following raw materials: the thermoset modified additive for asphalt mixture, matrix asphalt and mineral aggregate.

Wherein the weight pan proportions of the raw materials are: thermoset modified additive for asphalt mixture 1-5, matrix asphalt 2-8 and mineral aggregate 87-97.

Especially, the weight part proportions of the raw materials are: thermoset modified additive for asphalt mixture 2-3, matrix asphalt 3-4 and mineral aggregate 94.

Wherein the thermoset modified additive for asphalt mixture is prepared according to the following steps:

1) mixing resin, curing agent, promoter, flow agent, filler and additive well, adding the mixture into an extruder for extrusion treatment, so as to obtain an extruded material;

2) subjecting the extruded material to grinding treatment or granulation treatment after it is cooled, so as to obtain a material with particle size of less than 1 mm, i.e. the thermoset modified additive for asphalt mixture, Especially, the temperature for the extrusion treatment is 90-120° C.

Wherein the mineral aggregate consists of aggregate and mineral powder.

Another aspect of the present invention is to provide the use of the asphalt mixture in paving and repairing of steel bridge decks, tunnels, airports, high-grade highways and arterial streets.

Still another aspect of the present invention is to provide a method for preparation of asphalt mixture, comprising the following steps:

(1) mixing the thermoset modified additive for asphalt mixture and preheated aggregate with stirring, and stirring well the mixture to obtain it first mixture material:

(2) adding matrix asphalt into the first mixture material, and stirring well to obtain a second mixture material;

(3) adding mineral powder into the second mixed material, and stirring well to obtain the asphalt mixture;

wherein in the steps (1)-(3), the stirring temperature is 130-210° C., and the stirring time is 10-600 s.

The technical solution of the present invention has the following advantages:

1. The thermoset modified additive for asphalt mixture according to the present invention is prepared by dry process modification technology and has simple and reliable application process, the prepared thermoset modified additive is powdery with small particle size and easy to disperse in asphalt mixture.

2. The asphalt mixture proposed M the present invention is prepared by directly mixing thermoset modified additive with mineral aggregate and asphalt, without the step of preparing modified asphalt, and has simple operation process and can be produced continuously 3. The asphalt mixture prepared by the method of the present invention successfully avoids the problems regarding compatibility and thermostability which conventional methods of preparing modified asphalt have, and overcomes the defects of thermostability reduction occurring during long-distance transportation, and dissociation, thermal decomposition and index reduction easily, etc, occurring during heat storage management of modified asphalt on the scene, thus lowering production cost, saving energy and reducing emission.

4. The adding amount of the thermoset modified additive for asphalt mixture prepared according to the present invention can be determined or regulated according to specific engineering conditions by a construction unit, and the asphalt mixture prepared using the thermoset modified additive is suitable for paving and repairing of steel bride decks, tunnels, airports, highways and arterial streets Specific Mode for Carrying Out the Present Invention The present invention now is further described with reference to the following examples, and the advantages and characteristics of the present invention would be clearer with the description. However, such examples are only illustrative, and are not intended to constitute any limitation to the scope of the present invention. The skilled person in the art should understand that without deviating from the spirit and scope of the present invention, modifications and replacements can be made to the detail and form of the technical solution of the present invention, however, such modifications and replacements all fall into the protection scope of the present invention.

Example 1. Preparation of Thermoset Modified Additive for Asphalt Mixture 1) Pretreatment of raw materials
The raw to materials are prepared according to the following weight part proportions:

| | |
|---|---|
| epoxy resin E-12 | 68 |
| 2-methylimidazole | 0.1 |
| calcium carbonate | 28.4 |
| dicyandiamide | 3 |
| acrylate | 0.5 |

The raw materials as mentioned above are broken into granules for use;
2) The broken raw materials are added into a high-speed mixer for mixing for 5-15 min, and then added into a twin screw extruder for mixing-extruding treatment to obtain a tablet-like extruded material;
wherein the temperature of feeding section in the extruder is 90° C., and the discharging temperature is 120° C., the thickness of the extruded material is 1 mm.
3) The extruded material is subjected to grinding treatment after it is naturally) cooled, so as to obtain a ground material with particle size of ≤1 mm thermoset modified additive for asphalt mixture.

Example 2. Preparation of Thermoset Modified Additive for Asphalt Mixture

1) Pretreatment of raw materials
The raw materials are prepared according to the following weight part proportions:

| | |
|---|---|
| epoxy resin | 50 |
| DMP-30 | 2.5 |
| barium sulfate | 21.5 |
| hydroxyl-terminated phenolic resin | 25 |
| acrylate | 1 |
| silane coupling agent | 0.1 |

The raw materials as mentioned above are broken into granules for use;
2) The broken raw materials are added into a high-speed mixer for mixing for 5-15 min, and then added into a twin screw extruder for mixing-extruding treatment to obtain a tablet-like extruded material;
wherein, the temperature of feeding section in the extruder is 90° C. and the discharging temperature is 120° C.; the thickness of the extruded material is 1 mm.
3) The extruded material is subjected to grinding treatment after it is naturally cooled, so as to obtain a ground material with particle size of ≤1 mm, i.e. the thermoset modified additive for asphalt mixture.

Example 3. Preparation of Thermoset Modified Additive for Asphalt Mixture

1) Pretreatment of raw materials
The raw materials are prepared according to the following weight part proportions:

| | |
|---|---|
| epoxy resin E12 | 70 |
| acrylate | 0.8 |
| silane coupling agent | 0.1 |
| sebacic dihydrazide | 5.3 |
| talc powder | 23.9 |

The raw materials as mentioned above are broken into granules for use;
2) The broken raw materials are added into a high-speed mixer for mixing for 5-15 min, and then added into a twin screw extruder for mixing-extruding treatment to obtain a tablet-like extruded material;
wherein the temperature of feeding section in the extruder is 90° C., and the discharging temperature is 120° C.; the thickness of the extruded material is 1 mm.
3) The extruded material is subjected to grinding treatment after it is naturally cooled, so as to obtain a ground material with particle size of ≤1 mm, i.e. the thermoset modified additive for asphalt mixture.

Example 4. Preparation of Thermoset Modified Additive for Asphalt Mixture 1) pretreatment of raw materials
The raw materials are prepared according to the following weight part proportions:

| | |
|---|---|
| epoxy resin E-12 | 35 |
| acrylate | 0.8 |
| silane coupling agent | 0.15 |
| polyester resin | 35 |
| silica | 29.2 |

The raw materials as mentioned above are broken into granules for use;
2) The broken raw materials are added into a high-speed mixer for mixing, for 5-15 min, and then added into a twin screw extruder for mixing-extruding treatment to obtain a tablet-like extruded material;
wherein the temperature of feeding section in the extruder is 90° C., and the discharging temperature is 120° C.; and the thickness of the extruded material is 1 mm.
3) The extruded material is subjected to grinding treatment after it is naturally cooled, so as to obtain a ground material with particle size of ≤1 mm, i.e. the thermoset modified additive for asphalt mixture.

Example 5. Preparation of Thermoset Modified Additive for Asphalt Mixture

1) Pretreatment of raw materials
The raw materials are prepared according to the following weight part proportions:

| | |
|---|---|
| polyester resin | 65 |
| acrylate | 6 |
| silane coupling agent | 0.1 |
| triglycidyl isocyanurate | 6 |
| clay | 23 |

The raw materials as mentioned above are broken into granules for use;
2) The broken raw materials are added into a high-speed mixer for mixing for 5-15 min, and then added into a twin screw extruder for mixing-extruding treatment to obtain a tablet-like extruded material;
wherein the temperature of feeding section in the extruder is 90° C., and the discharging temperature is 120° C.; the thickness of the extruded material is 1 mm.

3) The extruded material is subjected to grinding treatment after it is naturally cooled, so as to obtain a ground material with particle size of ≤1 mm, i.e. the thermoset modified additive for asphalt mixture.

Example 6. Preparation of Thermoset Modified Additive for Asphalt Mixture

1) Pretreatment of Raw Materials
The raw materials are prepared according to the following weight part proportions:

| | |
|---|---|
| epoxy resin | 56.5 |
| DMP-30 | 0.5 |
| silane coupling agent | 2 |
| 2-methylimidazole | 1 |
| calcium carbonate | 40 |

The raw materials as mentioned above are broken into granules for use;

2) The broken raw materials are added into a high-speed mixer for mixing for 5-15 min, and then added into a twin screw extruder for mixing-extruding treatment to obtain a tablet-like extruded material;
wherein the temperature of feeding section in the extruder is 90° C., and the discharging temperature is 120° C.; the thickness of the extruded material is 1 mm.

3) The extruded material is subjected to grinding treatment after it is naturally cooled, so as to obtain a ground material with particle size of ≤1 mm, i.e. the thermoset modified additive for asphalt mixture.

Example 7. Preparation of Thermoset Modified Additive for Asphalt Mixture

1) Pretreatment of raw materials
The raw materials are prepared according to the following weight part proportions:

| | |
|---|---|
| epoxy resin | 45.5 |
| 2-methylimidazole | 2.5 |
| calcium carbonate | 20 |
| acrylic resin | 30 |
| acrylate | 2 |

The raw materials as mentioned above are broken into granules for use;

2) The broken raw materials are added into a high-speed mixer for mixing for 5-15 min, and then added into a twin screw extruder for mixing-extruding treatment to obtain a tablet-like extruded material;
wherein the temperature of feeding section in the extruder is 90° C., and the discharging temperature is 120° C.; the thickness of the extruded material is 1 min 3) The extruded material is subjected to grinding treatment after it is naturally cooled, so as to obtain a ground material with particle size of ≤1 mm, i.e. the thermoset modified additive for asphalt mixture.

Example 8. Preparation of Thermoset Modified Additive for Asphalt Mixture

1) Pretreatment of raw materials
The raw materials are prepared according to the following weight part proportions:

| | |
|---|---|
| epoxy resin | 40 |
| acrylate | 5 |
| hydroxyl-terminated phenolic resin | 25 |
| calcium carbonate | 30 |

The raw materials as mentioned above are broken into granules for use;

2) The broken raw materials are added into a high-speed mixer for mixing for 5-15 min, and then added into a twin screw extruder for mixing-extruding treatment to obtain a tablet-like extruded material;
wherein the temperature of feeding section in the extruder is 90° C., and the discharging temperature is 120° C.; the thickness of the extruded material is 1 mm, 3) The extruded material is subjected to grinding treatment after it is naturally cooled, so as to obtain a ground material with particle size of ≤1 mm, i.e. the thermoset modified additive for asphalt mixture.

Example 9. Preparation of Asphalt Mixture

1) The raw materials are prepared according to the following weight part proportions:

| | |
|---|---|
| thermoset modified additive for asphalt mixture | 2 |
| mineral aggregate | 94 |
| matrix asphalt | 4 |

The AC-13 type of the mineral aggregate is selected to use in the Examples of the present invention, which consists of aggregate and mineral powder, and the mineral aggregate gradation is shown in Table 1:

TABLE 1

| | gradation composition of mineral aggregate | | | | | | | | | |
|---|---|---|---|---|---|---|---|---|---|---|
| mesh (mm) | 16 | 13.2 | 9.5 | 4.75 | 2.36 | 1.18 | 0.6 | 0.3 | 0.15 | 0.075 |
| Sieving rate (%) | 100 | 95 | 76.5 | 53 | 37 | 26.5 | 19 | 14 | 10 | 6 |

The thermoset modified additive for asphalt mixture in the present example is prepared in Example 1.

2) The modified additive for asphalt mixture is added into the aggregate preheated to 165° C. with stirring, and stirred well to obtain a first mixture material; wherein the stirring temperature is 160° C., and the stirring time is 30 s.

3) The matrix asphalt is added into the first mixture material, and stirred well to obtain a second mixture material; wherein the stirring temperature is 160° C., and the stirring time is 90 s.

4) The mineral powder is added into the second mixture material, and stirred well to obtain the asphalt mixture, wherein the stirring temperature is 160° C., and the stirring time is 90 s.

Example 10. Preparation of Asphalt Mixture

1) The raw materials are prepared according to the following weight pan proportions:

| thermoset modified additive for asphalt mixture | 2 |
| mineral aggregate | 94 |
| matrix asphalt | 4 |

The mineral aggregate used in the present example of the invention is the same as that in Example 9;

The modified additive for asphalt mixture in the present example is prepared in Example 2.

2) The thermoset modified additive for asphalt mixture is added into the aggregate preheated to 135° C. with stirring, and stirred well to obtain a first mixture material; wherein the stirring temperature is 130° C., and the stirring time is 600 s.

3) The matrix asphalt is added into the first mixture material, and stirred well to obtain a second mixture material; wherein the stirring temperature is 130° C., and the stirring time is 600 s.

4) The mineral powder is added into the second mixture material, and stirred well to obtain the asphalt mixture, wherein the stirring temperature is 130° C., and the stirring time is 600 s.

Example 11. Preparation of Asphalt Mixture

1) The raw materials are prepared according to the following weight part proportions:

| thermoset modified additive for asphalt mixture | 3 |
| mineral aggregate | 94 |
| matrix asphalt | 3 |

The mineral aggregate used in the present example of the invention is the same as that in Example 9;

The modified additive for asphalt mixture in the present example is prepared in Example 2.

2) The thermoset modified additive for asphalt mixture is added into the aggregate preheated to 215° C. with stirring, and stirred well to obtain a first mixture material; wherein the stirring temperature is 210° C., and the stirring time is 10 s.

3) The matrix asphalt is added into the first mixture material, and stirred well to obtain a second mixture material; wherein the stirring temperature is 210V, and the stirring time is 10s.

4) The mineral powder is added into the second mixture material, and stirred well to obtain the asphalt mixture; wherein the stirring temperature is 210° C., and the stirring time is 10 s.

The asphalt mixture prepared according to the present invention can be used for paving and repairing of steel bride decks, tunnels, airports, high-grade highways and arterial streets by conventional paving and repairing methods.

Experimental Example 1

The asphalt mixtures prepared in Examples 9-11 are further prepared into Marshall specimens via conventional methods. The specimens are molded at 160° C., cured at 150° C. for 2 h, and then subjected to Marshall performance test. The test results are shown in Table 2.

TABLE 2

Results of Marshall performance test

| | VV (Volume of Air Voids)/% | VMA (Voids in Mineral Aggregate)/% | VFA (Voids Filled with Asphalt)/% | MS (Marshall Stability)/kN | FL (flow value)/mm |
|---|---|---|---|---|---|
| Technical standard | 4-6 | ≥14 | 65-75 | ≥8 | 1.5-4 |
| Example 9 | 5.7 | 16.8 | 66.2 | 36 | 2.1 |
| Example 10 | 5.32 | 16.4 | 67.7 | 48.36 | 2.33 |
| Example 11 | 5.97 | 17.01 | 65.1 | 77.82 | 1.6 |

It can be seen from Table 2 that each performance index, of the asphalt mixture prepared according to the present invention meets corresponding requirement, the Marshall stability can all be up to above 4 times of the required value, and it can be used for paving and repairing of steel bride decks, tunnels, airports, high-grade highways and arterial streets.

The examples above are only intended to describe the preferable embodiments of the present invention, and not intended to limit the scope of the present invention, and without deviating from the spirit of the present invention, various variants and modifications made by common engineering technicians in the art all fall into the protection scope defined b the claims of the present invention.

INDUSTRIAL APPLICABILITY

The present invention provides a thermoset modified additive for asphalt mixture, which is prepared by a simple method, i.e., thermosetting dry process modification technology, and can be subjected to continuous production. The prepared asphalt mixture has good stability and is suitable for paving and repairing of steel bride decks, tunnels, airports, highways and arterial streets. The asphalt mixture of the present invention is prepared by directly mixing the thermoset modified additive for asphalt mixture with mineral aggregate and asphalt, without the step of preparing modified asphalt, has simple operation process, and can be subjected to continuous production. The asphalt mixture prepared according to the present invention successfully avoids the problems regarding compatibility and thermostability present in conventional methods for preparing modified asphalt, and overcomes the defects of thermostability reduction occurring during long-distance transportation, and dissociation, thermal decomposition and index reduction easily occurring during heat storage management of modified asphalt on the scene, thus lowering production cost, saving energy and reducing emission.

What is claimed is:
1. An asphalt mixture comprising:
a matrix asphalt or modified asphalt;
a mineral aggregate consisting of aggregate and mineral powder; and
a thermoset modified additive having a particle size of less than 1 mm comprising resin, curing agent, promoter, flow agent, filler and additive as raw materials, wherein the weight part proportions of the raw materials in the thermoset modified additive are resin 35-70, curing agent 1-35, promoter 0-2.5, flow agent 0-6, filler 20-40 and additive 0-2.

2. The asphalt mixture according to claim 1, characterized in that, the resin is one or more of an epoxy resin, polyester resin, phenolic resin and polyurethane; and in that the thermoset modified additive is in an amount of 1-5 weight parts, the matrix asphalt or modified asphalt is in an amount of 2-8 weight parts, and the mineral aggregate is in an amount of 87-97 weight parts.

3. The asphalt mixture according to claim 1, characterized in that, the curing agent is one or more of an amine curing agent, anhydride curing agent, hydrazide curing agent, imidazole curing agent, hydroxyl-terminated phenolic resin, polyester resin, acrylic resin, polyglycidyl ester, hydroxyalkylamide and oxazoline; and the promoter is one or more of imidazole promoter, tertiary amine promoter or metal oxide, and in that the mineral aggregate comprises aggregate and mineral powder.

4. The asphalt mixture according to claim 1, characterized in that, the flow agent is one or more of an acrylate, silicone resin, phenolic resin, amino resin and cellulose acetate butyrate.

5. The asphalt mixture according to claim 1, characterized in that, the filler is one or more of a clay, talc powder, calcium carbonate, barium sulfate and silica.

6. The asphalt mixture according to claim 1, characterized in that, the additive is a coupling agent or a plasticizer.

7. A method for preparing an asphalt mixture comprising a thermoset modified additive, a matrix asphalt or modified asphalt and a mineral aggregate; the thermoset modified additive comprising raw materials including a resin, a curing agent, a promoter, a flow agent, a filler and an additive, wherein the weight part proportions of the raw materials in the thermoset modified additive are: resin 35-70, curing agent 1-35, promoter 0-2.5, flow agent 0-6, filler 20-40 and additive 0-2, the method comprising:

1) mixing the resin, the curing agent, the promoter, the flow agent, the filler and the additive well to form a mixture;

2) adding the mixture obtained from step 1 into an extruder for extrusion treatment at a temperature of from 90 to 120° C. to obtain an extruded material; and 3) after the extruded material is cooled, subjecting the extruded material to a grinding treatment or a granulation treatment to obtain the thermoset modified additive which does not include the matrix asphalt and has a particle size of less than 1 mm; and 4) mixing the thermoset modified additive with the matrix asphalt or modified asphalt and the mineral aggregate.

8. The method according to claim 7, characterized in that, the resin is one or more of epoxy resin, polyester resin, phenolic resin and polyurethane.

9. The method according to claim 7, characterized in that, the curing agent is one or more of amine curing agent, anhydride curing agent, hydrazide curing agent, imidazole curing agent, hydroxyl-terminated phenolic resin, polyester resin, acrylic resin polyglycidyl ester, hydroxyalkylamide and oxazoline; and the promoter is one or more of imidazole promoter, tertiary amine promoter or metal oxide.

10. The method according to claim 7, characterized in that, the flow agent is one or more of acrylate, silicone resin, phenolic resin, amino resin and cellulose acetate butyrate.

11. The method according to claim 7, characterized in that, the filler is one or more of clay, talc powder, calcium carbonate, barium sulfate and silica.

12. The method according to claim 7, characterized in that, the additive is coupling agent or plasticizer.

13. An asphalt mixture, characterized in that, the asphalt mixture comprises:
    a thermoset modified additive;
    a matrix asphalt or modified asphalt; and
    a mineral aggregate;
    wherein the weight part proportions are: thermoset modified additive 1-5, matrix asphalt or modified asphalt 2-8, and mineral aggregate 87-97,
    wherein the mineral aggregate consists of aggregate and mineral powder,
    wherein the thermoset modified additive comprises raw materials including a resin, a curing agent, a promoter, a flow agent, a filler and an additive,
    wherein the weight part proportions of the raw materials in the thermoset modified additive are resin 35-70, curing agent 1-35, promoter 0-2.5, flow agent 0-6, filler 20-40 and additive 0-2,
    and wherein the thermoset modified additive is obtained by:

1) mixing the resin, the curing agent, the promoter, the flow agent, the filler and the additive well to form a first mixture;

2) adding the first mixture into an extruder for extrusion treatment at a temperature of from 90 to 120° C. to obtain an extruded material; and 3) after the extruded material is cooled, subjecting the extruded material to a grinding treatment or a granulation treatment to obtain the thermoset modified additive which does not have the matrix asphalt or modified asphalt and has a particle size of less than 1 mm.

14. A method of using the asphalt mixture according to claim 13 in paving and repairing a road surface of steel bride decks, tunnels, airports, high-grade highways and arterial streets, the method comprising applying the asphalt mixture on the road surface.

15. A method for preparing the asphalt mixture according to claim 13, characterized in that the method comprises the following steps:

(4) mixing the thermoset modified additive and preheated aggregate under stirring, and stirring well to obtain a second mixture;

(5) adding the matrix asphalt or the modified asphalt into the second mixture, and stirring well to obtain a third mixture;

(6) adding mineral powder into the third mixture, and stirring well to obtain the asphalt mixture;

wherein the stirring temperature in steps (4)-(6) is from 130 to 210° C., and the stirring time is from 10 to 600 seconds.

* * * * *